(12) United States Patent
Awazu et al.

(10) Patent No.: US 6,292,443 B1
(45) Date of Patent: *Sep. 18, 2001

(54) INFORMATION RECORDING APPARATUS AND METHOD FOR PLAYING A PLURALITY OF INFORMATION RECORDING MEDIUMS

(75) Inventors: Koichi Awazu, Hidaka (JP); Jung-Tsung Lui, Taipei (TW)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/703,501

(22) Filed: Aug. 27, 1996

(30) Foreign Application Priority Data

Aug. 29, 1995 (JP) ................................................ 7-220650

(51) Int. Cl.$^7$ ........................................................ G11B 7/00
(52) U.S. Cl. .................................. 369/44.26; 369/44.27; 369/15; 709/322
(58) Field of Search .............................. 369/44.27, 15, 369/44.26, 58, 54, 44.12, 190, 59, 112, 47; 395/681; 360/77.08; 709/322, 327

(56) References Cited

U.S. PATENT DOCUMENTS

| | | | |
|---|---|---|---|
| 4,653,030 | * 3/1987 | Tachibana et al. | 365/222 |
| 4,758,914 | * 7/1988 | Ishii | 360/75 |
| 4,797,867 | * 1/1989 | Sunagawa et al. | 369/44.12 |
| 4,928,192 | * 5/1990 | Bartlett et al. | 360/77.08 |
| 4,989,195 | * 1/1991 | Suzuki | 369/50 |
| 5,042,025 | * 8/1991 | Aoyagi et al. | 369/190 |
| 5,054,014 | * 10/1991 | Ito et al. | 369/190 |
| 5,132,947 | * 7/1992 | Kameda et al. | 369/32 |
| 5,172,354 | * 12/1992 | Otsubo | 369/44.27 |
| 5,237,549 | * 8/1993 | Shimozawa | 369/44.17 |
| 5,329,510 | * 7/1994 | Tsuyuguchi et al. | 369/47 |
| 5,329,516 | * 7/1994 | Hoshi et al. | 369/77.1 |
| 5,438,344 | * 8/1995 | Oliva | 345/530 |
| 5,644,561 | * 7/1997 | Son et al. | 369/58 |
| 5,659,533 | * 8/1997 | Chen et al. | 369/112 |
| 5,684,773 | * 11/1997 | Hayashi | 369/59 |
| 5,721,949 | * 2/1998 | Smith et al. | 710/5 |
| 5,734,637 | * 3/1998 | Ootaki et al. | 369/112 |
| 5,745,460 | * 4/1998 | Tateishi | 369/58 |
| 5,758,049 | * 5/1998 | Johnson et al. | 345/302 |
| 5,761,699 | * 6/1998 | Hatanaka | 711/101 |
| 5,771,334 | * 6/1998 | Yamauchi et al. | 386/95 |
| 5,864,870 | * 1/1999 | Guck | 707/104 |
| 6,075,665 | * 6/2000 | Chainer et al. | 360/48 |

FOREIGN PATENT DOCUMENTS

| | | |
|---|---|---|
| 2-98725 | * 4/1990 | (JP) . |
| 6-131855 | 5/1994 | (JP) . |
| 6-324830 | 11/1994 | (JP) . |

* cited by examiner

Primary Examiner—B. James Peikari
(74) Attorney, Agent, or Firm—Finnegan, Henderson, Farabow, Garrett & Dunner, L.L.P.

(57) ABSTRACT

An optical disc drive control apparatus according to the present invention comprises a disc drive into or from which various optical discs are inserted or ejected. The system includes a first memory for storing various players that play back various optical discs, a second memory for storing a table in which combinations of various information recording mediums and various players corresponding to these mediums are written, and a disc manager, which comprises a unit for sensing the type of an optical disc inserted into the disc drive, a unit for referring to the table in the second memory and deriving the type of a player corresponding to the sensed type of optical disc, as well as the type of data stored on the disk, and a unit for driving one of the various players stored in the first memory which is of the type derived by the deriving means and causing the player to play back the optical disc.

24 Claims, 10 Drawing Sheets

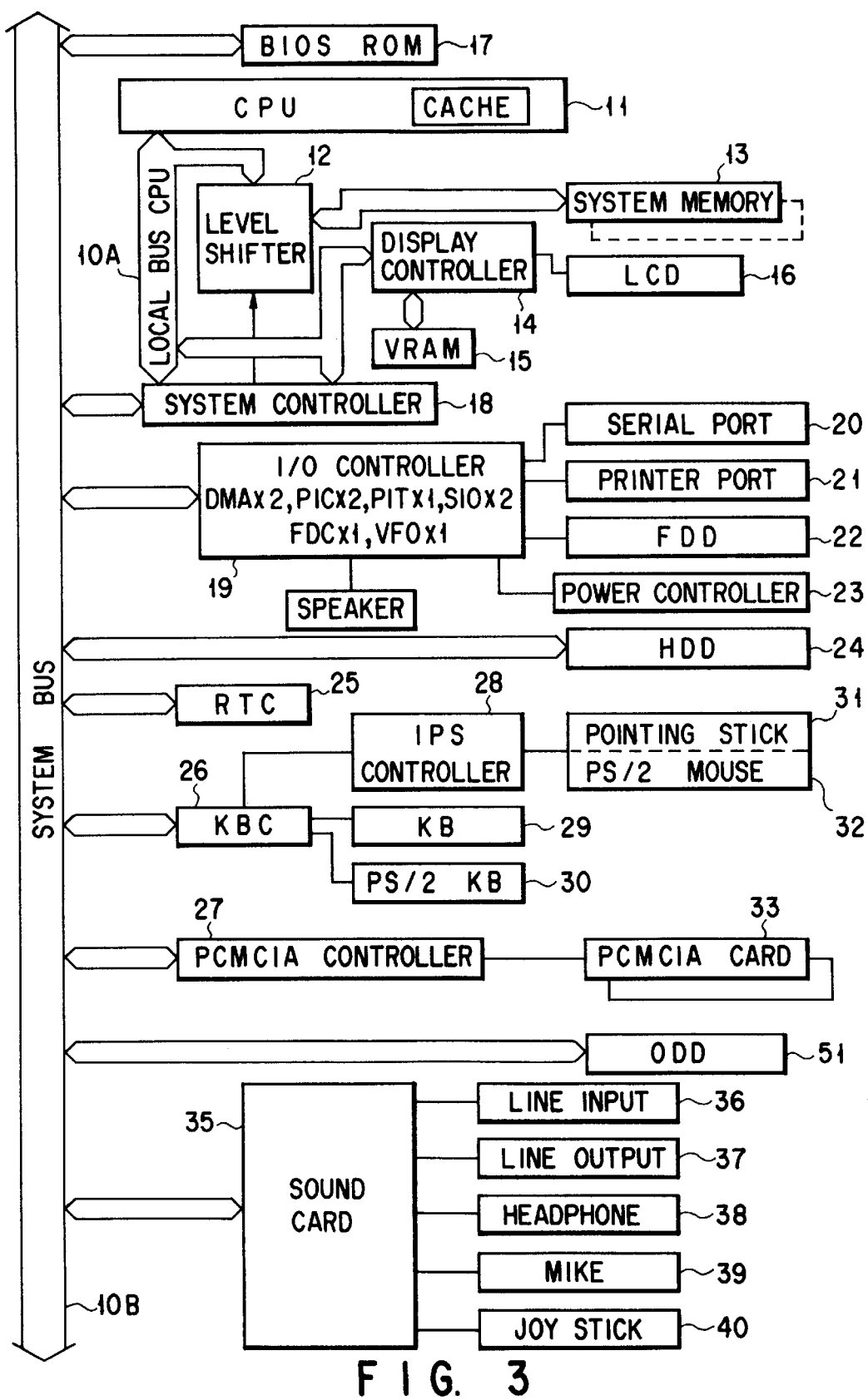
F I G. 3

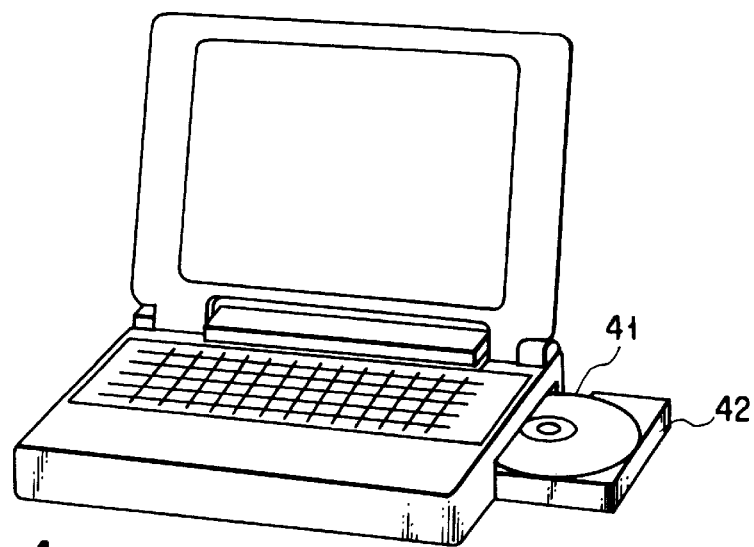
F I G. 4
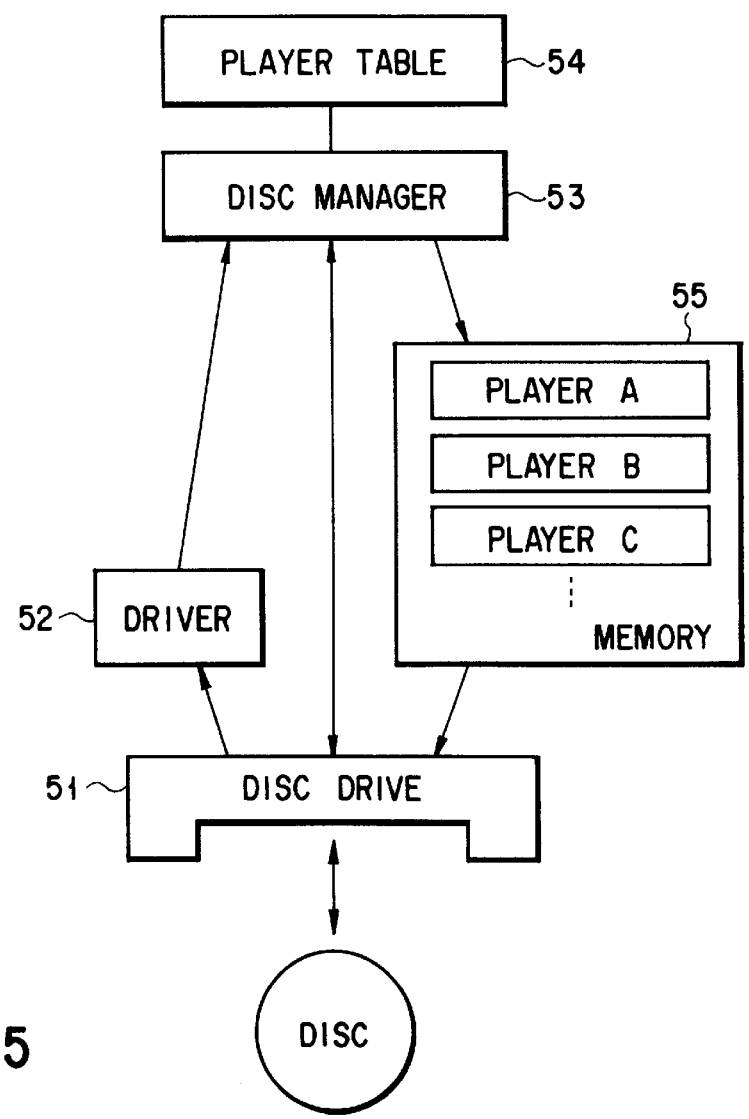
F I G. 5

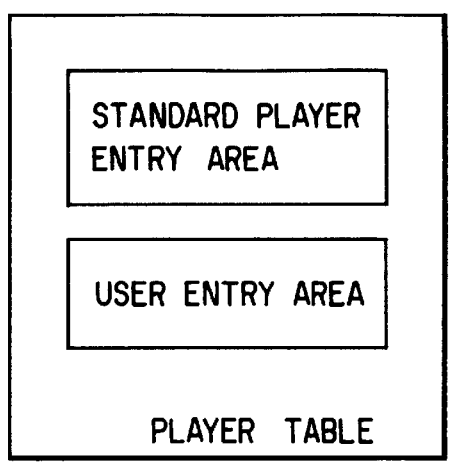
FIG. 6A
| ID CODE | TYPE OF PLAYER |
|---------|----------------|
| CD 1    | MUSIC          |
| CD 2    | PHOTO          |
| CD 3    | VIDEO          |
| CD 4    | GAME           |
| CD 5    | CAR NAVIGATION |
| CD 6    | MOVIE          |
| DVD     | DVD            |
FIG. 6B
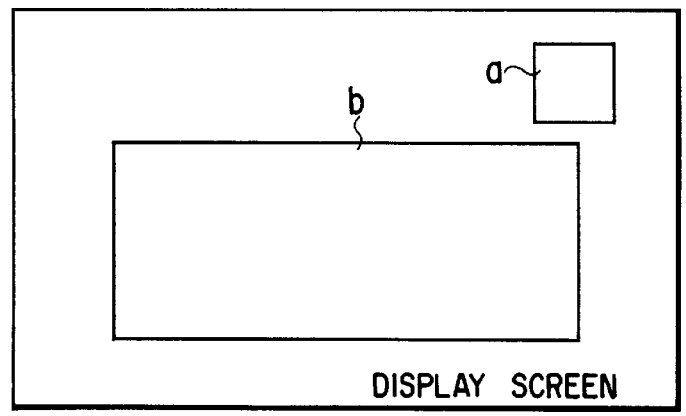
FIG. 9A
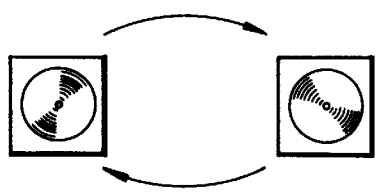
FIG. 9B
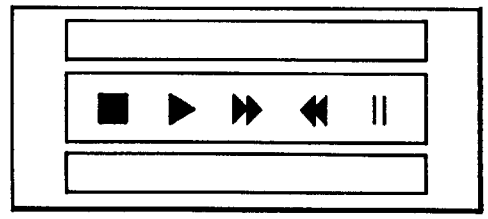
FIG. 9C

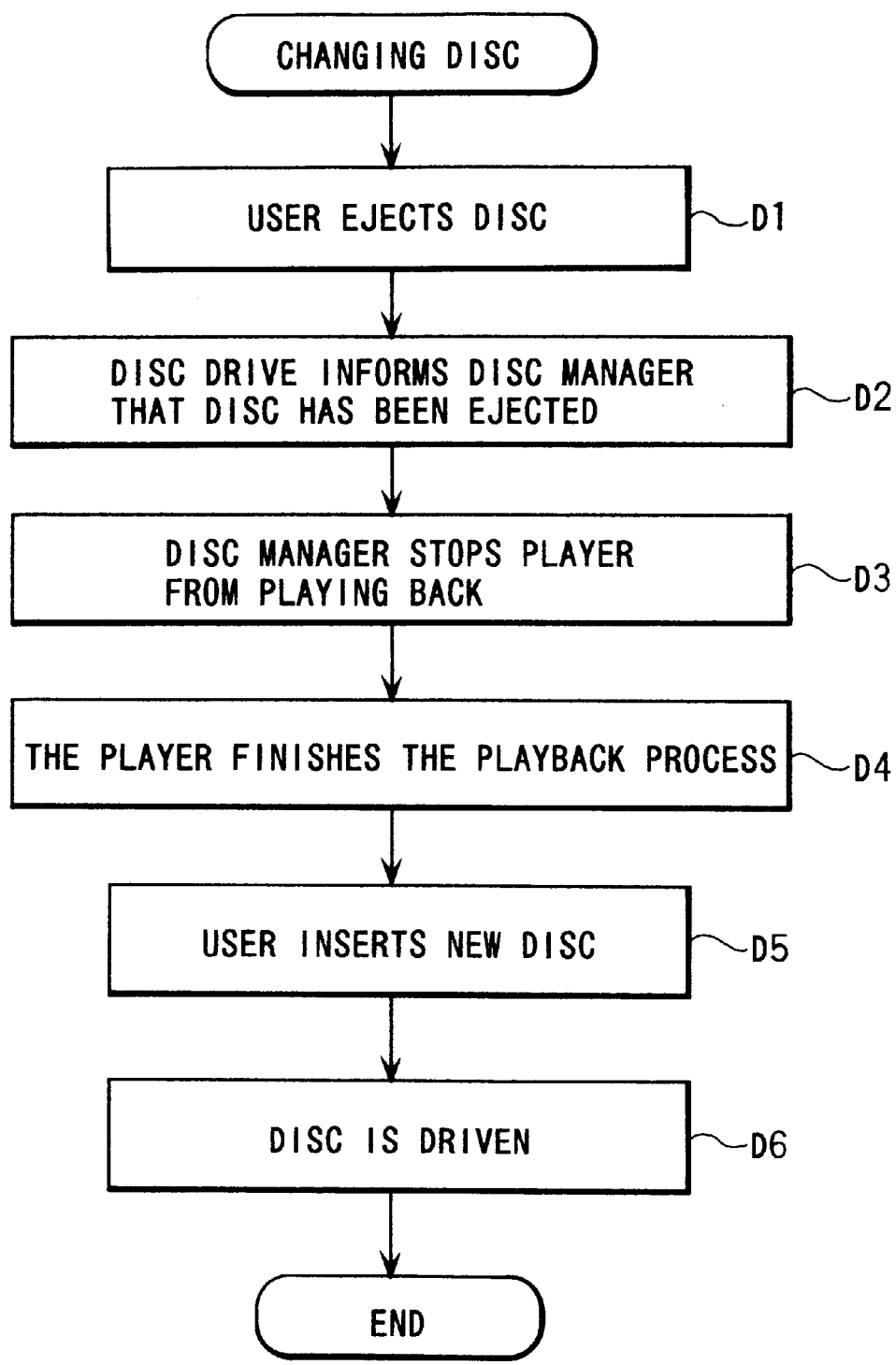
F I G. 8

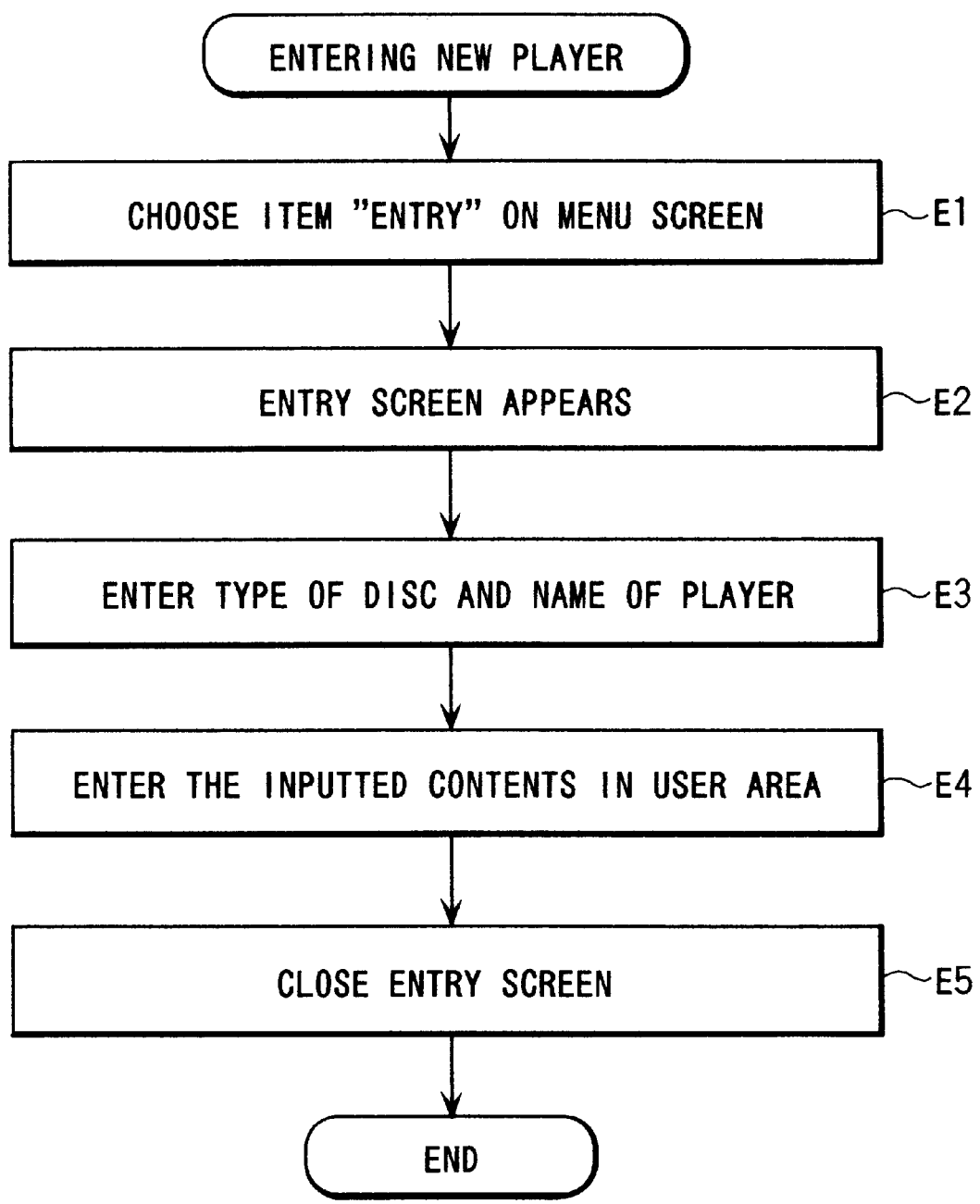
F I G. 10

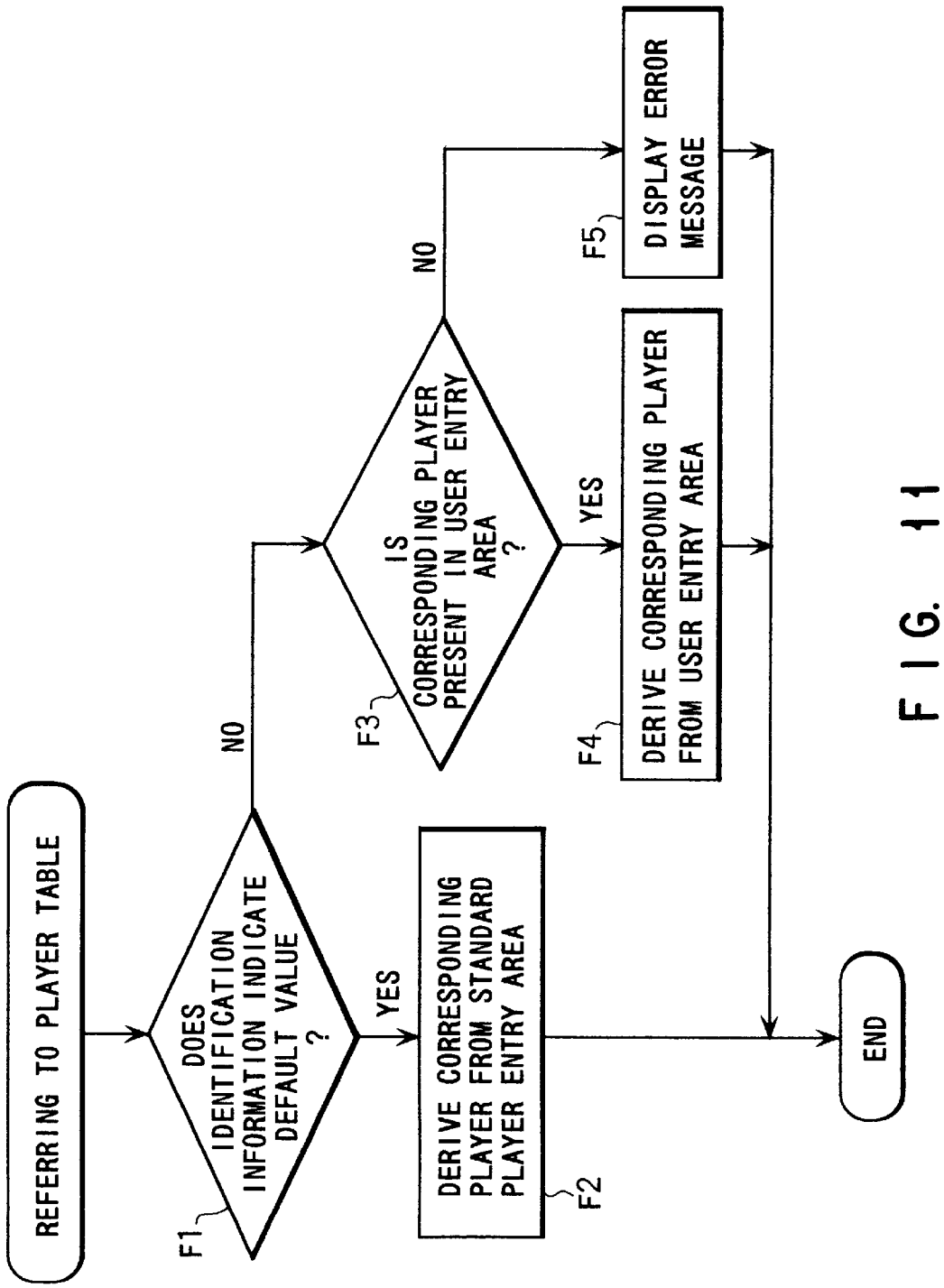
F I G. 11

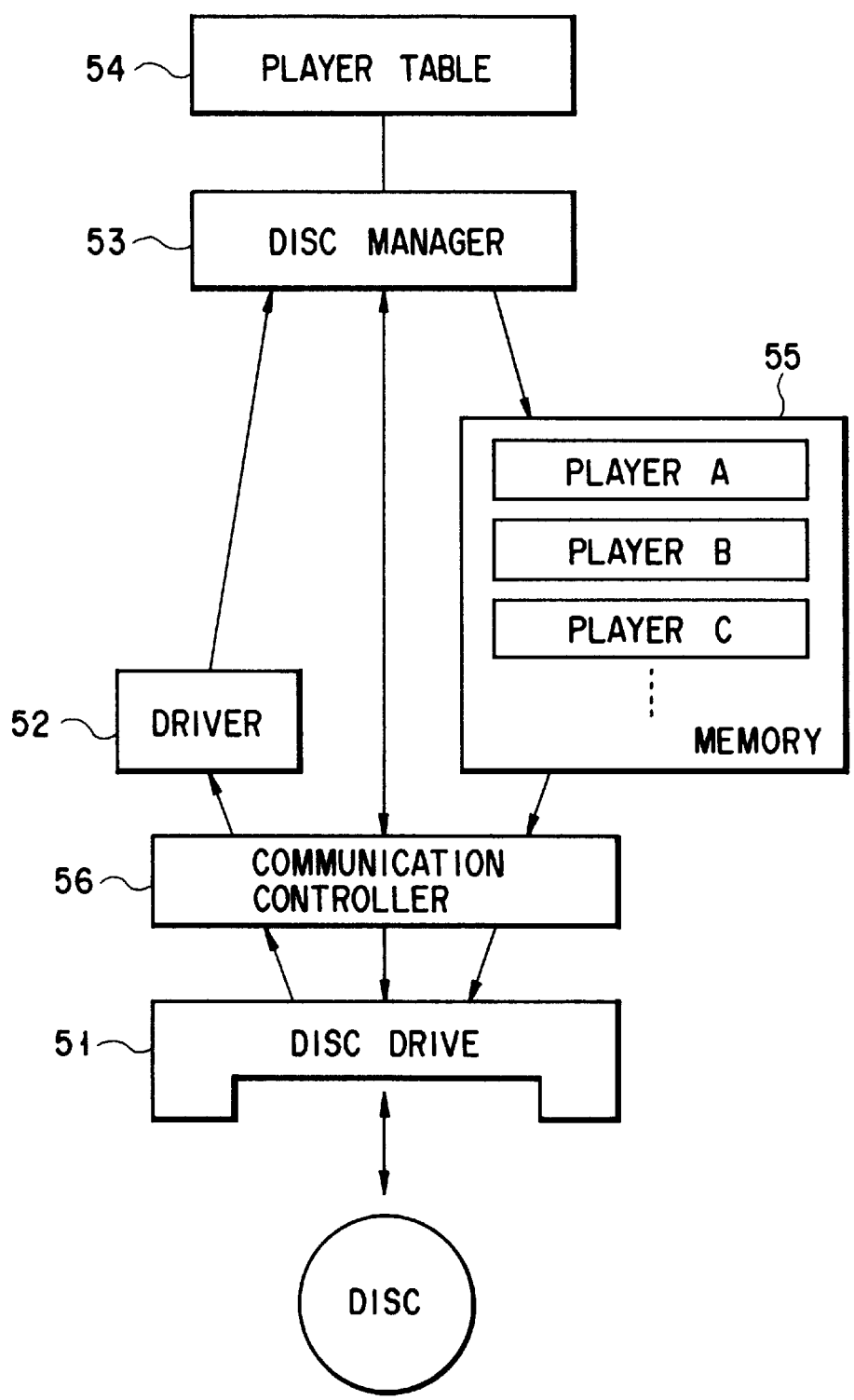
F I G. 12

INFORMATION RECORDING APPARATUS AND METHOD FOR PLAYING A PLURALITY OF INFORMATION RECORDING MEDIUMS

BACKGROUND OF THE INVENTION

1. Field of the Invention

The present invention relates to an information recording medium drive control apparatus applied to an information processing apparatus provided with a drive that allows the change of information recording mediums.

2. Description of the Related Art

In recent years, information processing apparatuses, such as portable computers, incorporating CD-ROM (Compact Disc Read-Only Memories) drivers have been popularized. CD-ROMs that are capable of driving optical disc drives provided in such information processing apparatuses include music CD-ROMs, photo CD-ROMs, video CD-ROMs, video-game CD-ROMs, car navigation CD-ROMs, and movie CD-ROMs.

Since these CD-ROMs each have the information recorded in a different format, to read the information from a CD-ROM requires a player compatible with the format of the CD-ROM. To meet this requirement, some commercially available information processing apparatuses of recent date are provided with several types of players so that various types of CD-ROMs can be played back. These players are offered in software form and normally consist of application program modules.

Referring to a flowchart in FIG. 1, the process of playing back a CD-ROM will be explained.

First, to play back a CD-ROM, the user chooses item "CD" on the screen of a display (step A1). This causes a selection menu for prompting the user to choose the type of a CD-ROM to appear on the screen of the display (step A2). The selection menu contains various items including music, photo, video, game, car navigation, and movie, for example. If the user chooses "PHOTO," for example (step A3), the photo player (application program) stored in a ROM or the like is loaded into a main memory (step A4).

Next, the user inserts a photo CD-ROM into the drive of the electronic apparatus (step A5). The drive drives the CD-ROM automatically and brings it in steady rotation (step A6). Then, the photo player performs the playback process by reading the information from the CD-ROM (step A7).

As seen from the processing flow, to play back the desired CD-ROM, the user has to choose a suitable one from the players. Because of this, the user feels that the selection of a player is troublesome. In a case where playback must be performed rapidly, the user may feel that it takes a long time to complete the selection.

Furthermore, after the selection of the player has finished, the user does not necessarily insert a suitable CD-ROM into the drive. Because the user might insert the wrong CD-ROM by mistake, he or she is always nervous when inserting a CD-ROM, worrying about making a mistake. If the wrong type of CD-ROM is inserted, malfunction may result. When a malfunction has occurred or the playback has not been performed due to the insertion of the wrong type of CD-ROM, the user may waste time until the cause of the malfunction has been corrected.

Recently, DVDs (digital video discs), whose specification differs from that of conventional CDs, have begun coming onto the market. The types of information recording mediums dealt with by personal computers or the like are expected to increase in number. With many types of players being available, the user will have to choose a suitable one from the many types of players, he or she is more liable to choose the wrong player by mistake, making the selection work more troublesome.

To overcome these problems, there have been demands for the techniques for, when an information recording medium is played back, automatically choosing a player compatible with the type of the information recording medium inserted in the drive without the user choosing the player.

Now, the process of changing the CD-ROM being played back will be described.

The photo player is now playing back a photo CD-ROM (step B1). To change the photo CD-ROM to a music CD-ROM, the us e r stops the playback operation of the photo player (step B2) and ejects the photo CD-ROM from the drive (step B3). The user chooses the music player corresponding to music CD-ROMs (step B4) and inserts a music CD-ROM into the drive (step B5). This causes the music player to play back the music CD-ROM (step B6).

As seen from the processing flow, to change the photo CD-ROM, the user must stop the playback operation of the photo player. If the user does not stop the player or carries out an operation different from the stop operation by mistake, the following problem will arise. Even after the photo CD-ROM has been changed to a music CD-ROM, the photo player keeps playing pack as it has done. This permits the music player and photo player to read the information from the music CD-ROM at the same time, resulting in malfunction.

To overcome this problem, there have been demands for the techniques for, when an information recording medium being played back is changed, automatically stopping t he player corresponding to the information recording medium ejected from the drive without the user stopping the player.

SUMMARY OF THE INVENTION

Accordingly, an object of the present invention is to provide an information recording medium drive control apparatus and method that, when playing back an information recording medium, automatically choose a player compatible with an information recording medium inserted in the drive without the user choosing the player.

Another object of the present invention is to provide an information recording medium drive control apparatus and method that, when changing the information recording medium being played back, automatically stop the player corresponding to the information recording medium ejected from the drive without the user stopping the player.

According to a first aspect of the present invention, there is provided an information recording medium drive control apparatus comprising a disc drive into or from which various information recording mediums are inserted or ejected; means for storing various players that play back various information recording mediums; means for sensing the type of an information recording medium inserted into the disc drive; means for deriving the type of a player corresponding to the sensed type of the information recording medium; and means for driving one of the various players stored in the storing means which is of the derived type and causing the player to play back the information recording medium.

According to a second aspect of the present invention, there is provided an information recording medium drive control apparatus comprising a disc drive into or from which various information recording mediums are inserted or ejected; means for storing various players that play back various information recording mediums; means for sensing that an information recording medium has been ejected from the disc drive; and means for stopping the player from playing back on the basis of the sensing result from the sensing means.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiment of the present invention and, together with the general description given above and the detailed description of the preferred embodiment given below, serve to explain the principles of the present invention in which:

FIG. 3 is an overall block diagram of a portable computer provided with an optical disc drive controlling apparatus according to an embodiment of the present invention;

FIG. 4 is a perspective view of the portable computer provided with the optical disc drive controlling apparatus of the embodiment;

FIG. 5 is a block diagram of the sections constituting the optical disc drive control apparatus of the embodiment;

FIGS. 6A and 6B are drawings to help explain the details of a player table provided in the optical disc drive control apparatus of FIG. 5;

FIG. 8 is a flowchart for changing the optical disc on the optical disc drive control apparatus of the embodiment;

FIGS. 9A, 9B and 9C show screens on the display of the portable computer provided with the optical disc drive control apparatus of the embodiment;

FIG. 10 is a flowchart for entering new players in the portable computer provided with the optical disc drive control apparatus of the embodiment;

FIG. 11 is a flowchart for the disc manager referring to the player table in the optical disc drive control apparatus of the embodiment; and FIG. 12 is a block diagram of a modification of the optical disc drive control apparatus of FIG. 5.

DETAILED DESCRIPTION OF THE PREFERRED EMBODIMENTS

Figure 1:
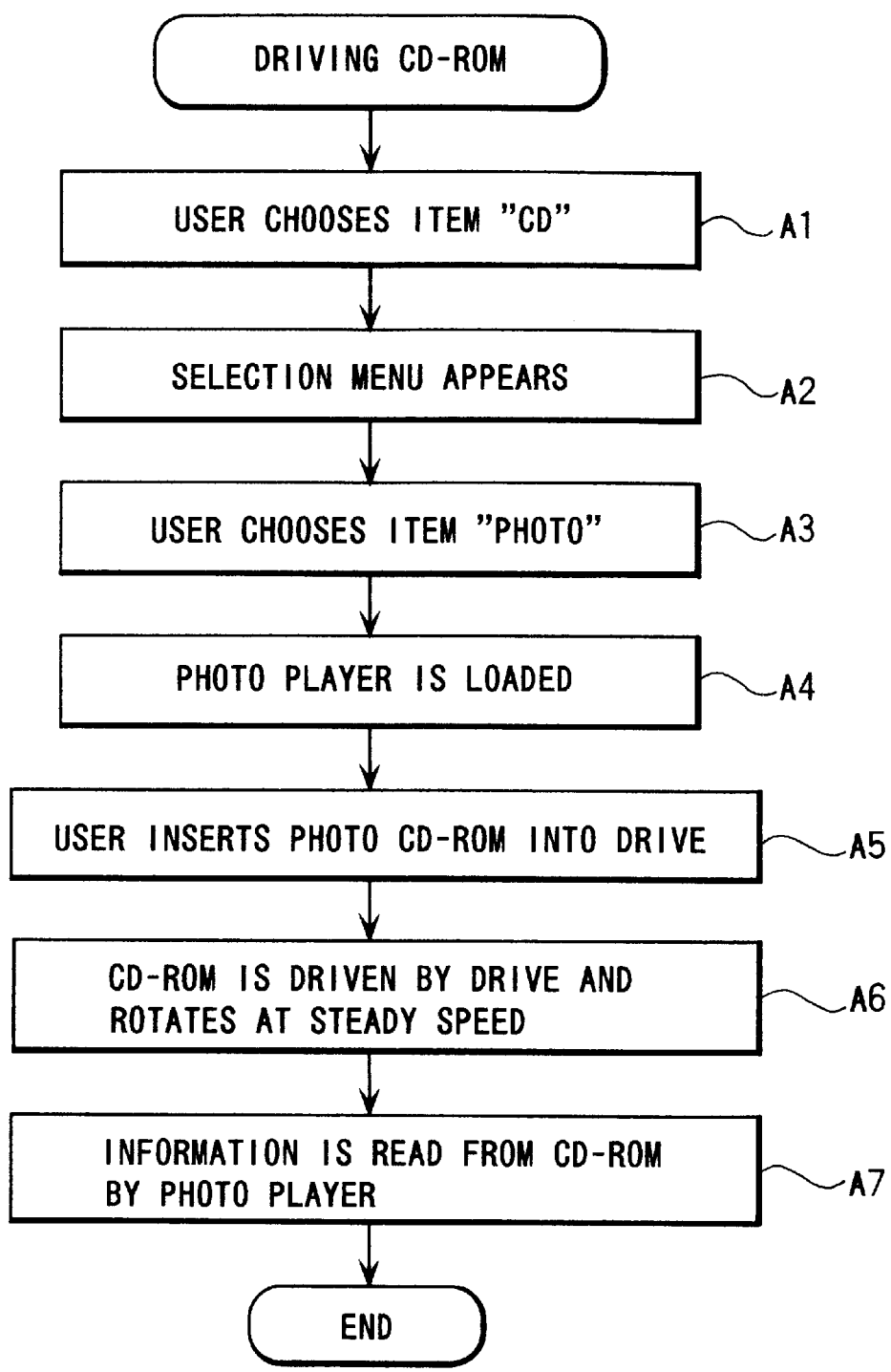
FIG. 1 is a flowchart for playing back a conventional information recording medium.
Figure 2:
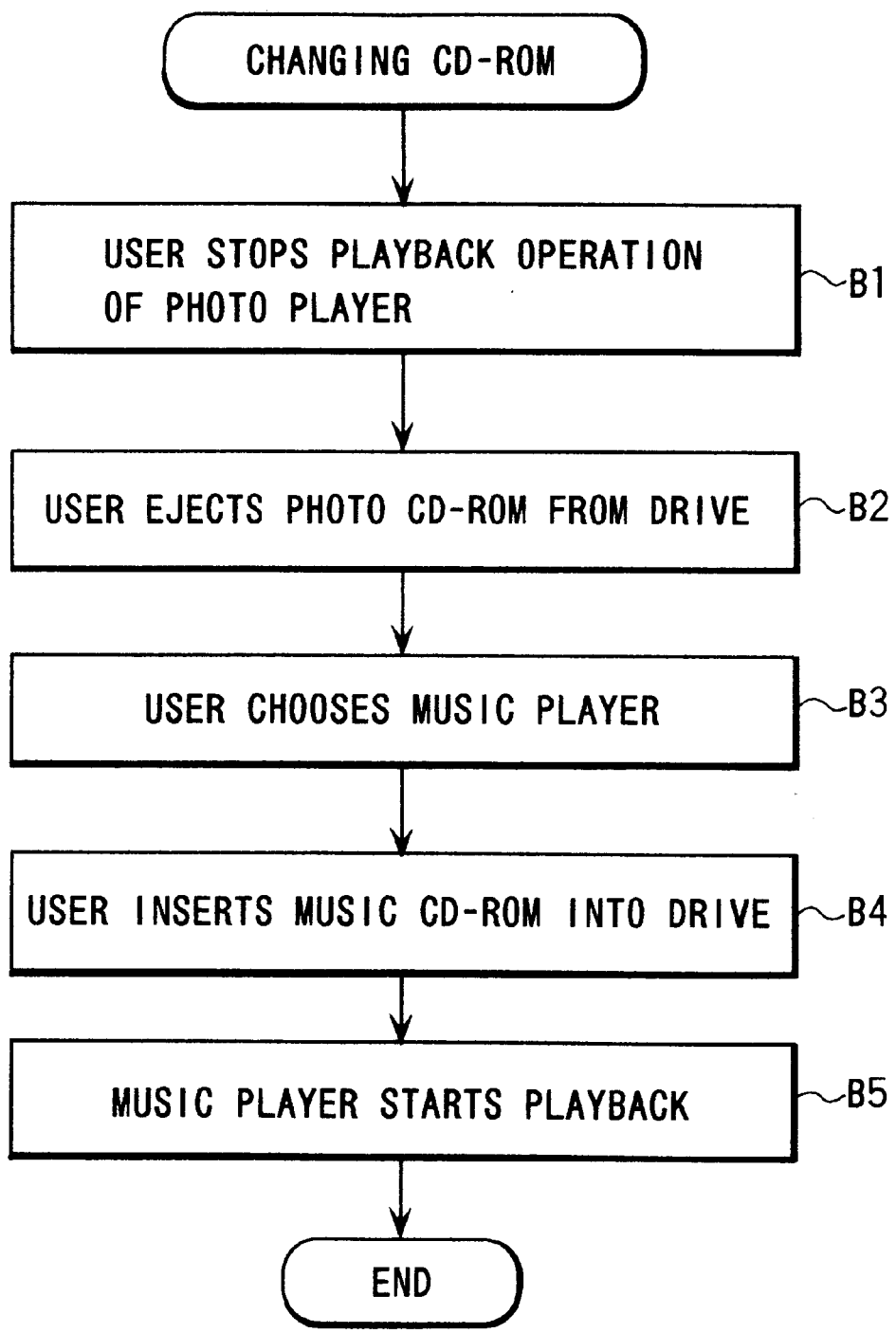
FIG. 2 is a flowchart for changing a conventional information recording medium.

Hereinafter, referring to the accompanying drawings, an embodiment of the present invention will be explained.

FIG. 3 is a block diagram of the overall system configuration of a personal computer provided with an information recording medium drive control apparatus (an optical disc-drive controlling apparatus) according to an embodiment of the present invention.

The personal computer, which is a laptop computer or a notebook computer, comprises a CPU local bus (processor bus) 10A, a system bus 10B complying with the ISA (Industry Standard Architecture) specification, a CPU 11, a level shifter (a level shift gate array) 12, a system memory 13, a display controller 14, a video memory (VRAM) 15, and a flat panel display 16.

The CPU 11, which controls the entire system, executes programs stored in the system memory 13. A CPU capable of operating on 3.3 V or 5 V, such as an Intel's microprocessor SL Enhanced Intel 486, is used as the CPU 11. A power supply voltage of 3.3 V is supplied from a power supply controller 23 explained later to the CPU 11. The CPU 11 incorporates a cache memory with the data size of a single line being 32 bits×4. The CPU local bus 10A of the CPU 11 includes a 32-bit data bus, a 32-bit address bus, and various status signal lines.

The system memory 13 stores an operating system, applications programs to be processed, user data items created by the application programs. The system memory 13 is composed of a 5-V dynamic RAM.

The level shifter (level shift gate array) 12 is connected between the 32-bit data bus included in the CPU local bus 10A and the system memory 13. The level shifter 12 converts the voltage level of the data signal from the CPU local bus 10A from 3.3 V to 5 V and transfers the 5-V signal to the system memory 13. The level shifter 12 also converts the voltage level of the data signal from the system memory 13 from 5 V to 3.3 V and transfers the 3.3-V signal to the CPU local bus 10A. The process of converting the voltage level of the data signal is carried out at the transfer circuit in the level shifter 12. To realize high-speed data transfer with the CPU bus cycle remaining in asynchronization with the read access cycle of the system memory 13, a read transfer circuit is provided with a data latch function of latching the read data from the system memory 13.

The display controller 14 controls the flat-panel display 16 composed of an STN (supertwisted nematic) monochrome liquid-crystal display, an STN color liquid-crystal display, or a TFT color liquid-crystal display. The display controller 14 receives the display data from the CPU 11 via the CPU local bus 10A and writes it into the video memory (VRAM) 15.

Connected to the system bus 10B are a BIOS ROM (Basic Input/Output System Read-Only Memory) 17, a system controller 18, and an I/O controller 19.

The BIOS ROM 17, which stores a system BIOS, is composed of a flash memory that enables programs to be rewritten. The system BIOS contains an IRT routine to be executed when the power supply is turned on, a device driver for controlling various I/O devices, a system management program, and a setup program.

The system controller 18 is made up of a bridge device connecting the CPU local bus 10A to the system bus 10B and a memory logic circuit that controls various memories in the system.

The I/O controller 19 controls the I/O units connected to a serial port 20, the printer and/or external FDD connected to the parallel port (printer port) 21, and a built-in 3.5-inch FDD 22.

The I/O controller 19 contains two DMA controllers for direct memory access control, two interrupt controllers (PIC: Programmable Interrupt Controllers), a system timer (PIT: Programmable Interval Timer), two serial I/O controllers (SIO: Serial Input/Output Controllers), and a floppy-disc controller (FDC).

The I/O controller 19 also contains an I/O register group used for communication between a power supply controller (PSC) 23 and the CPU 11 and an I/O register group for setting the environment of a parallel port 21.

Connected further to the system bus 10B are a built-in hard-disc drive (HDD) 24, a real time clock (RTC) 25, a keyboard controller (KBC) 26, a PCMCIA controller 27 conforming to the PCMCIA (Personal Computer Memory Card International Association) specification, and a sound card 35.

The real time clock (RTC) 25 is a clock module having its own operating battery and includes a CMOS (Complementary Metal Oxide Semiconductor) static RAM (referred to as a CMOS memory) to which the battery always supplies power. The CMOS memory stores the environment setting information on the system operating environment.

The keyboard controller (KBC) 26, which controls an built-in keyboard 29 provided on the computer body, scans the key matrix of the built-in keyboard 29 to sense the signal corresponding to the pressed key, and converts the signal into a specific key code (scan code). Furthermore, the keyboard controller 26 has the function of controlling an external keyboard 30 optionally connected and the function of controlling a pointing stick 31 and a mouse 32 using an IPS controller 28 acting as a dedicated processor. The pointing stick 31 is formed integrally with the keyboard unit of the built-in keyboard 29.

The PCMCIA controller 27 provides access control of an optional PC card 33 complying with the JEIDA (Japan Electronic Publishers Association)/PCMCIA specification.

A sound card 35 is provided with a PCM (Pulse Code Modulation) sound source and a digital signal processing circuit of audio signals. Connected to the sound card 35 are a line input terminal 36, a line output terminal 37, a headphone terminal 38, a microphone terminal 39, and a joystick terminal 40.

Connected further to the system bus 10B is an optical disc drive (ODD) 51. The optical disc drive 51 is capable of driving a CD-ROM and a DVD.

The optical disc drive control apparatus of the present invention is provided in the above optical disc drive 51, although not shown in FIG. 3.

FIG. 4 is a perspective view of a personal computer provided with the optical disc drive control apparatus according to the embodiment of the present invention.

As shown in the figure, the personal computer is provided with a tray 42 on which a desired medium 41 is put. The tray 42 slides toward the inside or outside of the personal computer body by the user pressing a specific button. This enables an optical disc to be inserted or ejected into or from the optical disc drive 51 in the personal computer.

The optical disc 41 put on the tray 42 may be a music optical disc, a photo optical disc, a video optical disc, a game optical disc, a car-navigation optical disc, or a movie optical disc, for example.

FIG. 5 is a block diagram of the sections constituting the optical disc drive control apparatus according to the embodiment of the present invention.

The optical disc drive 51 drives various types of optical discs. As described above, it is capable of driving a CD-ROM and a DVD. The disc drive 51 allows the insertion or ejection of an optical disc put on the tray by the operation of the user.

When an optical disc has been inserted or ejected, the disc drive 51 generates a signal indicating the insertion or ejection. After having begun to drive the optical disc and brought the disc in steady rotation, the disc drive generates a signal indicating the fact. Furthermore, the disc drive 51 sends to the disc manager 53 the identification information indicating the type of the optical disc being driven.

The driver 52 is designed to sense a signal indicating the insertion or ejection of the disc into or from the disc drive 51 or a signal indicating the fact that the optical disc has reached steady rotation. When sensing the signal, the driver informs the disc manager of the fact, using various interrupt signals.

The disk manager 53 supervises the entire optical disc drive control.

For example, when the disc manager 53 has sensed from the interruption from the driver 52 that an optical disc has been inserted and that the optical disc has reached steady rotation, it starts to choose a player compatible with the optical disc.

During the choosing process, the disc manager 53 requires the disc drive 51 to report the type of the inserted optical disc. When the disc manager 53 has received the identification information indicating the type of the optical disc from the disc drive 51, it refers to the player table 54 and thereby derives the type of a suitable player. Furthermore, the disc manager 53 chooses the player indicated in the player table 54 from the various players residing in the memory 55 and drives the chosen player.

On the other hand, when the disc manager 53 has sensed from the interruption from the driver 52 that the optical disc has been ejected, it stops the player from playing back the disc.

Furthermore, the disc manager 53 manages additional entries in the user entry area of the player table 54.

The player table 54 is a table used by the disc manager 53 to derive the type of an optical disc on the basis of the identification information. The table has a standard player entry area in which a plurality of players have been prepared as the standard that the user cannot rewrite and a user entry area in which the user can enter additional players when wanting to add new types of optical discs. In each entry area, combinations of types of optical disc and types of player compatible with the types of optical discs are listed. For example, in the case of the standard player entry area, the contents as shown in FIG. 6B have been written. The contents of the standard player entry area can be shown by the user, if necessary, on the screen of the, display provided on the personal computer. To enter a player, the user causes the user entry area to appear on the screen of the display and enters the data on the screen from the keyboard.

In the memory 55, the players of necessary types reside. These players are loaded into the memory, as the need arises, from another storage medium, such as a hard disc. Each of these player is offered in software form and is composed of application program modules. The player driven by the disc manager 53 starts to play back the optical disc on the disc drive 51. On the other hand, the player stopped by the disc manager 53 finishes playing back the optical disc on the disc drive 51.

Now, the process of driving an optical disc in the optical disc drive control apparatus will be described by reference to FIG. 7.

First, when the user inserts a disc into the disc drive 51 (step C1), the disc drive 51 generates a signal indicating that an optical disc has been inserted (step C2). This causes the driver 52 to send to the disc manager 53 a signal indicating that an optical disc has been inserted (step C3).

When the disc drive 51 has driven the optical disc and brought it in steady rotation, it generates a signal indicating the fact (step C4). This causes the driver 52 to send to the disc manager 53 an interrupt signal indicting the fact that the optical disc has reached steady rotation (step C5).

Next, to carry out the process of choosing a player, the disc manager 53 sends to the disc drive 51 a request signal requiring notice of the type of the inserted optical disc (step C6). In response to the request signal, the disc drive 51 sends identification information indicating the type of the inserted optical disc to the disc manager 53 (step C7).

Referring to the player table 54, the disc manager 53 derives the player corresponding to the optical disc specified in the identification information received from the disc drive 51 (step C8). Then, the disc manager 53 chooses the player listed in the player table 54 from the various players residing in the memory 55 and drives the chosen player (step C9). The driven player then plays back the optical disc (step C10).

As described above, when the user inserts an optical disc into the disc drive 51, a suitable player is chosen automatically. Then, the chosen player starts to play back the optical disc automatically.

Referring to FIG. 8, the process of changing the optical disc in the optical disc drive control apparatus will be explained.

First, when the user ejects the optical disc from the disc drive 51 (step D1), the disc drive 51 sends to the disc manager 53 a signal indicating that the optical disc has been ejected (step D2). In response to the signal, the disc manager 53 stops the player from playing back the optical disc (step D3). This causes the player to finish the playback process (step D4).

When the user has inserted another optical disc into the disc drive 51 (step D5), the same process as the above driving process (refer to the flowchart of FIG. 7) is carried out (step D6).

When the user has changed the optical disc in this way, the player playing back the optical disc stops automatically, with the result that two players are prevented from being accessed at the same time.

Figure 7:
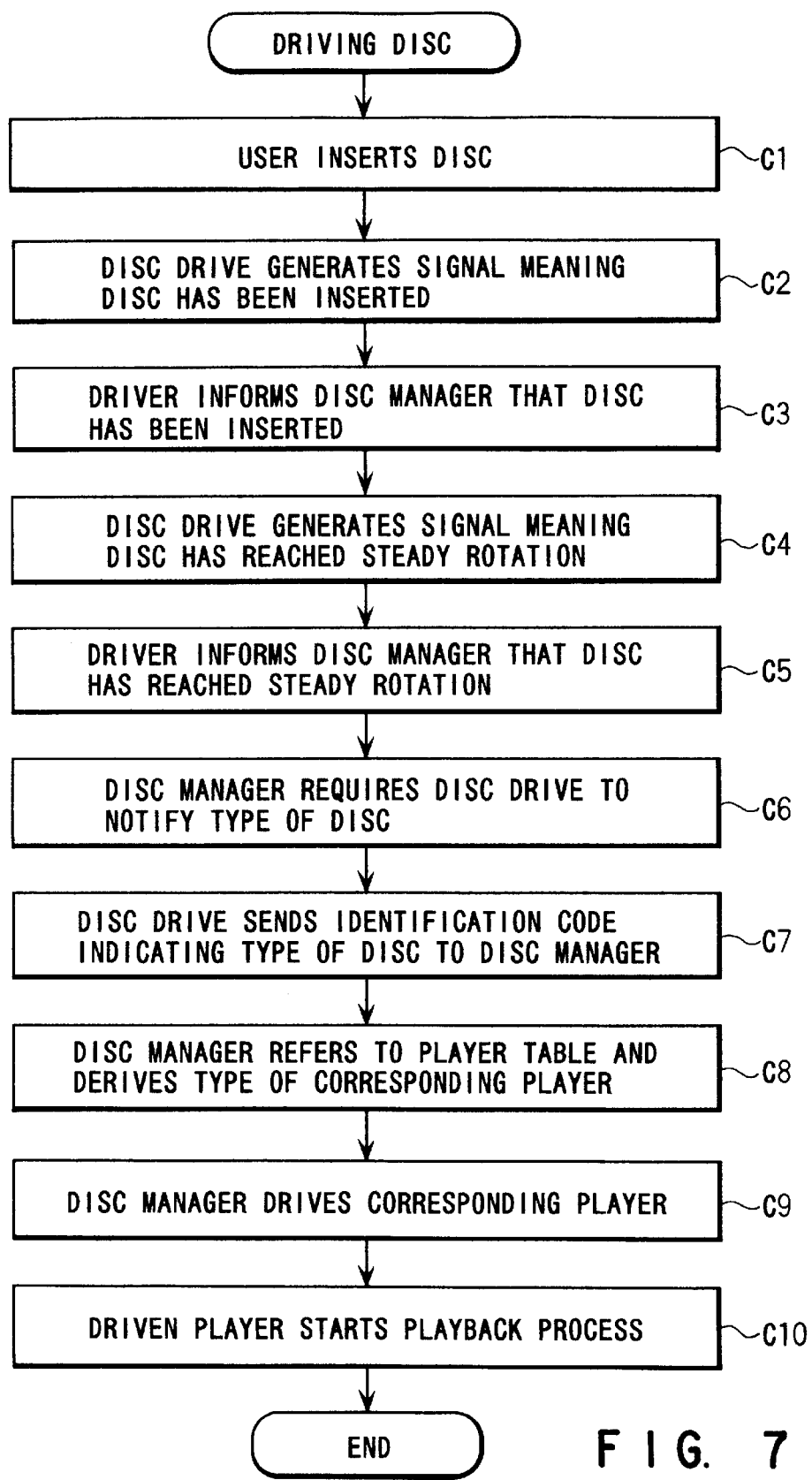
FIG. 7 is a flowchart for playing back an optical disc on the optical disc drive control apparatus of the embodiment.

It is desirable that provision should be made so that the user may be informed that the playback process is in preparation during the time from when the user inserted the optical disc until the disc manager has driven the player (in the interval ranging from step C1 to C9 in FIG. 7) in the optical disc driving process explained in the flowchart of FIG. 7.

Specifically, during the interval, two types of icons as shown in FIG. 9B appear alternately at intervals of 0.5 sec at section "a" on the screen of the display of the personal computer. This enables the icon image to appear visually as if the optical disc were rotating. Once the playback has been started, the alternate display of the icons is stopped.

With this configuration, after having inserted an optical disc, the user can understand visually what is going on until the playback process is started properly. This helps the user stop worrying about what is going on.

After the playback has been started, a tool bar for the user to operate the optical disc as shown in FIG. 9C appears at section "b" on the screen in FIG. 9A. The tool bar corresponds to the driven player.

Next, the process of the user entering a player that plays back a new type of optical disc will be described by reference to the flowchart of FIG. 10.

The user chooses the item "ENTRY" on the menu screen, for example (step E1). This causes an entry screen to appear (step E2). With the entry screen, the user enters the type of a new disc and the name of a player that plays back the disc from the keyboard or the like (step E3). This enables the input data to be entered in the user entry area (step E4). After having entered the necessary data, the user closes the entry screen (step E5).

Now, the procedure for referring to the player table after a new player has been entered will be described by reference to the flowchart of FIG. 11.

In referring to the player table 54, the disc manager 53 judges whether or not the identification information obtained from the disc drive 51 indicates the default value (step F1). If it indicates the default value, the disc manager 53 will derive the standard player corresponding to the default value from the standard player entry area (step F2). If it does not indicates the default value, the disc manager 53 will judge whether or not the player corresponding to the default value exists in the user entry area (step F3).

If it is present in the user entry area, the disc manager 53 will derive the player corresponding to the default value from the user entry area (step F4).

On the other hand, if it is not present in the user entry area, the disc manager 53 will judge that a player that can play back the optical disc does not exist and display an error message (step F5).

As described above, the user can enter an additional player as the need arises, which makes it easy to use a new type of optical disc (an optional medium) in addition to the existing types of optical discs (the default mediums) provided according to the standard specification.

The present invention is applicable to the case where the disc driver 51 is not built in the personal computer but externally provided to the system via a SCSI cable. In this case, because an externally provided disc drive 51 is provided with a communication controller, the configuration of the disc drive control apparatus differs from FIG. 5 and is as shown in FIG. 11. The communication controller 56 controls data exchange between the driver 52, disc manager 53, and memory 55 and the disc drive 51.

As described in detail so far, according to the first aspect of the present invention, to play back the desired optical disc, the user need not choose a suitable one from a plurality of players. This eliminates selection work the user feel to be troublesome. Since the playback process is carried out swiftly, the user need not worrying about time, even when the playback must be performed rapidly.

Since there is no possibility that after the desired medium has been inserted, the wrong type of player will be driven by mistake, the user can always enter the optical disc without worrying about mistake. Because there is no possibility that the wrong type of player will be driven, no malfunction will result.

Furthermore, the present invention can deal with DVDs (digital video discs) differing conventional CDs in specification. Even if the number of types of information recording mediums handled by the personal computer is increased further, the user need not choose a suitable one from many types of players, which eliminates the possibility of choosing the wrong player, preventing selection work from becoming complex.

Therefore, it is possible to realize a system that, when an information recording medium is played back, automatically chooses a player compatible with the type of the information recording medium inserted into the drive without the user choosing a player.

According to the second aspect of the present invention, since the playback operation of the corresponding player is stopped automatically when the optical disc is changed, the user need not stop the playback operation of the corresponding player manually. This prevents not only two types of players from accessing the optical disc simultaneously, but also malfunction from taking place.

Accordingly, it is possible to realize a system that, when an information recording medium being played back is changed, automatically stops the player corresponding to the information recording medium ejected from the drive without the user stopping the player.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For instance, while in the embodiment, the explanation has been centered on optical discs, the present invention may be applied to other information recording mediums, such as magneto-optical discs or magnetic discs.

What is claimed is:

1. An apparatus comprising:
   a plurality of software multimedia data players for playing back recording mediums having different types of multimedia data content, the multimedia data content being recorded in different formats;
   disc drive means for driving a recording medium inserted thereto, said disc drive means obtaining information indicative of a type of multimedia data content of the inserted recording medium therefrom;
   disc manager means for automatically driving an appropriate software multimedia data player which is one of said plurality of software multimedia data players and corresponds to the type of multimedia data content of the inserted recording medium, by receiving the information indicative of the type of multimedia data content of the inserted recording medium from said disc drive means; and
   a table in which combinations of said plurality of software multimedia data players and the different types of multimedia data content of the recording mediums have been registered, wherein
   in a case where a software multimedia data player corresponding to the inserted recording medium has been registered in said table, said disc manager means drives the corresponding software multimedia data player which has been registered, and
   in a case where the software multimedia data player corresponding to the inserted recording medium has not been registered in said table, said disc manager means informs a user of a non-registration of the corresponding software multimedia data player.

2. The apparatus according to claim 1, further comprising a table in which combinations of said plurality of software multimedia data players and the different types of multimedia data content of the recording mediums have been registered.

3. The apparatus according to claim 2, further comprising means for acquiring a software multimedia data player corresponding to the recording medium inserted to said disc drive means, by referring to said table.

4. The apparatus according to claim 1, further comprising driver means for sensing a signal indicating the insertion of the recording medium to said disc drive means and notifying said disc manager means of the insertion of the recording medium.

5. The apparatus according to claim 1, wherein each of said plurality of software multimedia data players is composed of an application software program.

6. An apparatus comprising:
   a plurality of software multimedia data players for playing back recording mediums;
   disc drive means for driving a recording medium inserted thereto, said disc drive means including means for detecting whether or not the recording medium being driven has been ejected therefrom; and
   disc manager means for automatically stopping one of said plurality of software multimedia data players from playing back even when the recording medium has been ejected from the disk drive means by a user at any time.

7. The apparatus according to claim 6, further comprising driver means for sensing a signal indicating the ejection of the recording medium from said disc drive means and notifying said disc manager means of the ejection of the recording medium.

8. The apparatus according to claim 6, wherein each of said plurality of software multimedia data players is composed of an application software program.

9. An apparatus comprising:
   a plurality of software multimedia data players for playing back recording mediums having different types of multimedia data content, the multimedia data content being recorded in different formats;
   disc drive means for driving a recording medium inserted thereto; and
   a table in which combinations of said plurality of software multimedia data players and the different types of multimedia data content of the recording mediums have been registered, wherein a user can additionally register a combination of a software multimedia data player and a corresponding type of multimedia data content of a recording medium in said table, wherein
   in a case where a software multimedia data player corresponding to the inserted recording medium has been registered in said table, the corresponding software multimedia data player which has been registered is driven, and
   in a case where the software multimedia data player corresponding to the inserted recording medium has not been registered in said table, the corresponding software multimedia data player which has not been registered is registered in said table.

10. The apparatus according to claim 9, wherein said table includes a standard registration entry area for registering the combinations of said plurality of software multimedia data players and the different types of multimedia data content of the recording mediums.

11. The apparatus according to claim 10, wherein said table includes a user registration entry area for registering the combination of the software multimedia data player and the corresponding type of multimedia data content.

12. The apparatus according to claim 11, further comprising means for selectively referring to one of the standard registration entry area and the user registration entry area, based on whether or not given information indicates a predetermined value.

13. A software player control method for use in a system including a plurality of software multimedia data players for playing back recording mediums having different types of multimedia data content and disc drive means for driving a recording medium inserted thereto, the multimedia data content being recorded in different formats, said method comprising the steps of:

provided a table in which combinations of said plurality of software multimedia data players and the different types of multimedia data content of the recording mediums have been registered;

obtaining by said disc drive means, information indicative of a type of multimedia data content of the inserted recording medium therefrom;

automatically driving an appropriate software multimedia data player which is one of said plurality of software multimedia data players and corresponds to the type of multimedia data content of the inserted recording medium, by receiving the information indicative of the type of multimedia data content of the inserted recording medium from said disc drive means;

in a case where a software multimedia data player corresponding to the inserted recording medium has been registered in said table, driving the corresponding software multimedia data player which has been registered; and in a case where the software multimedia data player corresponding to the inserted recording medium has not been registered in said table, informing a user of a non-registration of the corresponding software multimedia data player.

14. The method according to claim 13, further comprising the step of providing a table in which combinations of said plurality of software multimedia data players and the different types of multimedia data content of the recording mediums have been registered.

15. The method according to claim 14, further comprising the step of acquiring a software multimedia data player corresponding to the recording medium inserted to said disc drive means, by referring to said table.

16. The method according to claim 13, further comprising the step of sensing a signal indicating the insertion of the recording medium to said disc drive means.

17. The method according to claim 13, wherein each of said plurality of software multimedia data players is composed of an application software program.

18. A software player control method for use in a system including a plurality of software multimedia data players for playing back recording mediums and disc drive means for driving a recording medium inserted thereto, said method comprising the steps of:

detecting whether or not the recording medium being driven has been ejected from said disc drive means; and automatically stopping one of said plurality of software multimedia data players from playing back even when the recording medium has been ejected from the disk drive means by a user at any time.

19. The method according to claim 18, further comprising the step of sensing a signal indicating the ejection of the recording medium from said disc drive means.

20. The method according to claim 18, wherein each of said plurality of software multimedia data players is composed of an application software program.

21. A software player registering method for use in a system including a plurality of software multimedia data players for playing back recording mediums having different types of multimedia data content and disc drive means for driving a recording medium inserted thereto, the multimedia data content being recorded in different formats, said method comprising the steps of:

providing a table in which combinations of said plurality of software multimedia data players and the different types of multimedia data content of the recording mediums have been registered;

enabling a user to additionally register a combination of a software multimedia data player and a corresponding type of multimedia data content of a recording medium in said table;

in a case where a software multimedia data player corresponding to the inserted recording medium has been registered in said table, driving the corresponding software multimedia data player which has been registered, and in a case where the software multimedia data player corresponding to the inserted recording medium has not been registered in said table, registering in said table the corresponding software multimedia data player which has not been registered.

22. The method according to claim 21, wherein said table includes a standard registration entry area for registering the combinations of said plurality of software multimedia data players and the different types of multimedia data content of the recording mediums.

23. The method according to claim 22, wherein said table includes a user registration entry area for registering the combination of the software multimedia data player and the corresponding type of multimedia data content.

24. The method according to claim 23, further comprising the step of selectively referring to one of the standard registration entry area and the user registration entry area, based on whether or not given information indicates a predetermined value.

* * * * *